United States Patent
Yamaoka et al.

(10) Patent No.: US 6,936,293 B2
(45) Date of Patent: Aug. 30, 2005

(54) METHOD FOR PRESERVING TUNA (75) Inventors: Kanemitsu Yamaoka, 108, Hirabari 4-chome, Tenpaku-ku, Nagoya-shi, Aichi (JP); Hitoshi Imai, 1007-1-1, Hiroji-honmachi, Showa-ku, Nagoya-shi, Aichi (JP)

(73) Assignees: Kanemitsu Yamaoka, Nagoya (JP); Hitoshi Imai, Nagoya (JP)

( * ) Notice: Subject to any disclaimer, the term of this patent is extended or adjusted under 35 U.S.C. 154(b) by 245 days.

(21) Appl. No.: 10/033,781

(22) Filed: Jan. 3, 2002

(65) Prior Publication Data
US 2002/0127313 A1 Sep. 12, 2002

(30) Foreign Application Priority Data

Jan. 9, 2001 (JP) .................................. 2001-001644

(51) Int. Cl.[7] .............................................. A23B 4/044
(52) U.S. Cl. ................... 426/263; 426/264; 426/281; 426/315; 426/320; 426/327; 426/418; 426/524
(58) Field of Search ...................... 426/262–264, 426/314–315, 320, 327, 418, 524, 281

(56) References Cited

U.S. PATENT DOCUMENTS

| | | | | |
|---|---|---|---|---|
| 4,001,446 A | * | 1/1977 | Hood | 426/250 |
| 4,089,983 A | * | 5/1978 | Hood | 426/250 |
| 4,522,835 A | * | 6/1985 | Woodruff et al. | 426/264 |
| 5,484,619 A | | 1/1996 | Yamaoka et al. | 426/315 |
| 5,972,401 A | * | 10/1999 | Kowalski | 426/314 |
| 6,270,829 B1 | * | 8/2001 | Shaklai | 426/641 |
| 6,331,322 B1 | * | 12/2001 | Shih et al. | 426/315 |

FOREIGN PATENT DOCUMENTS

| | | | |
|---|---|---|---|
| JP | 363160564 A | * | 7/1988 |
| JP | 405308923 A | * | 11/1993 |
| JP | 05317000 A | * | 12/1993 |
| JP | 08168337 A | * | 7/1996 |
| JP | 2001-001644 | * | 2/2004 |

* cited by examiner

Primary Examiner—Drew Becker
(74) Attorney, Agent, or Firm—Oblon, Spivak, McClelland, Maier & Neustadt, P.C.

(57) ABSTRACT

A plurality of smoke injection needles are inserted into or then withdrawn from tuna meat while bubbles of smoke are ejected from the smoke injection needles at intervals. The smoke is produced by burning a smoking material and containing carbon monoxide (CO) gas. The bubbles of the smoke are thus dispersed and injected into the tuna meat, and the residual CO concentration in the tuna meat is thereby set at 1100 to 2400 $\mu g/kg$. The resulting smoked tuna meat M is preserved in frozen storage at about $-18°C$.

20 Claims, 4 Drawing Sheets

METHOD FOR PRESERVING TUNA

TECHNICAL FIELD OF THE INVENTION

The present invention relates to a method for appropriately preserving tuna to be eaten raw for use as a sliced raw fish (sashimi) or a stuff in sushi.

DESCRIPTION OF THE RELATED ART

Red pigments in fish meat mainly include myoglobin (Mb), hemoglobin (Hb), and other pigments containing heme iron. Tuna is a typical fish with red flesh. In tuna meat, Mb occupies 90% or more of heme iron-containing pigments in the red flesh and occupies 80% or more of dark red flesh. The core of fresh tuna meat shows purplish red color, and Mb in this region is a reduced Mb containing a divalent iron ion. When the reduced Mb is exposed to air, it is bonded with oxygen ($O_2$) in the air and is converted into bright red oxymyoglobin ($O_2$Mb). However, when the oxymyoglobin is further left stand, the divalent iron bonded with Mb is oxidized and is converted into trivalent iron and thereby yields brown metmyoglobin (MetMb) (this process is referred to as "browning" or "metmyoglobin-formation"). The metmyoglobin-formation proceeds, however, even without exposure to the air and rapidly proceeds with an elevating temperature. The metmyoglobin-formation can only be prevented by freezing at an extra-low temperature of −60° C. or below, treatment with carbon monoxide (CO) or pH control at present. The tuna containing bright red $O_2$Mb feels fresh, is therefore preferable and has high commercial value. However, the tuna containing brown metmyoglobin (MetMb) looks inferior and loses its commercial value.

To prevent browning and to keep the color of the flesh, tuna for use in sashimi is currently frozen at an extra-low temperature of −60° C. Such tuna meat is frozen at extra-low temperatures of less than or equal to −60° C. although components in the tuna meat can be prevented from deteriorating or denaturing by freezing at −18° C. (the temperature of a freezing compartment of a domestic refrigerator). This is because metmyoglobin-formation (browning) cannot be prevented during freezing at −18° C., and the resulting tuna meat loses its commercial value as a sliced raw fish (sashimi). However, the degree of degradation in freshness is not always in agreement with that of metmyoglobin-formation.

In this connection, such extra-low temperature freezing facilities at −60° C. are only used in Japan and are not generally used in foreign countries. Accordingly, the tuna frozen at −60° C. cannot significantly be used and treated in foreign countries.

Methods for preventing metmyoglobin-formation other than extra-low temperature freezing at −60° C. or below include a treatment with CO gas (a chemically synthesized 100% CO gas). However, the treatment with CO makes the color of the tuna meat not a natural color but an excessively bright pink color (unnaturally bright color) to thereby mask a change in color caused by degradation of the tuna meat, and a low-grade tuna with a deteriorated quality looks as if a tuna of high grade. The resulting tuna meat may make an incorrect impression about freshness on consumers. The treatment with CO can be performed by using a chemically synthesized 100% CO gas.

In addition, the treated tuna meat does not discolor for one or two years and keeps its bright color for periods from about several weeks to about half a year during freezing at −18° C. Accordingly, the tuna meat does not discolor for several months by storing in a domestic refrigerator, and thereby the consumers misread the freshness of the tuna meat.

Methods for preventing browning of the tuna meat and keeping the color of the flesh also include pH control. As in the tuna treated with CO gas, tuna which has been prevented from metmyoglobin-formation by pH control keeps its bright color over a long time and does not become brown about one week after thawing (when it is kept raw) as in natural untreated tuna. Accordingly, the consumers may also misread the freshness of the tuna meat.

The present inventor has already proposed a method, in which the quality of tuna meat to be eaten raw for use in sashimi or the stuff in sushi can be kept over a long time by smoking the same at low temperatures, in Japanese Unexamined Patent Application Publication No. 6-292503.

The proposed smoking is quite different from conventional methods for improving preservability of food by smoking. According to the proposed smoking, the quality of tuna meat is kept and metmyoglobin-formation is prevented by low-temperature smoking within such a range that the resulting tuna to be eaten raw has substantially equivalent mouthfeel, delicious taste and odor to those of conventional tuna to be eaten raw and can sufficiently be supplied to be eaten raw such as in sashimi.

In the method for smoking tuna meat to be eaten raw proposed by the present inventor, the tuna meat is smoked by burning a smoking material and passing the produced smoke through a filter to thereby remove unnecessary smells and tar, and bringing the smoke come into contact with fresh tuna meat. By changing the manner of using the filter, the resulting tuna meat can easily have the smell of smoked products or be made tasteless and odorless.

According to this method, however, when thick fillets of tuna meat are treated in order to efficiently treat the tuna meat, it takes a relatively short time for the smoke to permeate into a surface layer but it takes a long time to permeate the core of the tuna meat, and the freshness of the tuna meat is deteriorated during this operation.

The present inventor has made investigations on the relationship between time and depth of permeation of CO gas in the tuna meat. Specifically, when the smoke is brought into contact with tuna with fresh texture from the outer surface of the tuna meat, the smoke permeates the tuna meat 5 mm in 1 hour, 9.5 mm in 6 hours, 20 mm in 30 hours, and 25 mm in 48 hours. Specifically, when CO gas is brought into contact with the outer surfaces (the top and bottom surfaces) of tuna meat 50-mm thick, it takes 48 hours for the CO gas to completely permeate the core of the tuna meat, and the freshness is inevitably deteriorated and the taste and mouthfeel are decreased due to drip spill during this operation.

A lower temperature (e.g., from 1° C. to 3° C.) of the tuna meat during treatment is preferred in order to keep freshness. However, the rate of permeation of the smoke into the tuna meat during treatment decreases with a decreasing temperature of treatment.

The relationship between time and depth of permeation is determined at temperatures ranging from 1° C. to 3° C., but the depth of permeation increases with an elevating temperature.

When the tuna meat has somewhat deteriorated freshness or includes inferior flesh, it takes more time for the smoke to reach the core of the tuna meat. This is also true for the aforementioned case where the chemically synthesized 100% CO gas is brought into contact with the fresh tuna. The tuna in this case is yellow fin tuna.

To solve this problem, the present inventor has already proposed a method for efficiently preserving tuna to be eaten raw in Japanese Unexamined Patent Application Publication No. 8-168337. This method comprises the steps of inserting a number of smoke injection needles disposed in parallel at predetermined intervals into tuna meat, withdrawing the smoke injection needles from the tuna meat while repeating the injection of bubbles of the smoke into the tuna meat at intervals, thereby homogeneously and three-dimensionally injecting the smoke bubbles into the tuna meat at a predetermined pressure in a predetermined volume, and thereby preserving the tuna meat.

When tuna meat to be eaten raw is subjected to preservation according to the above method and is stored for a long time, the metmyoglobin-formation of the tuna meat is prevented by freezing at a temperature of about $-18°$ C. (the temperature of a freezing compartment of a domestic refrigerator) without the need of freezing at extra-low temperatures of $-60°$ C. However, the tuna meat should always be smoked to an appropriate extent in consideration of a CO concentration of untreated tuna meat (a background CO concentration).

Under these circumstances, the present inventor has found the following findings. Specifically, by injecting an appropriate amount of the smoke in consideration of the background CO concentration and thereby setting a residual CO concentration in the tuna meat at 1100 to 2400 $\mu g/kg$, the resulting tuna meat during freezing at about $-18°$ C. is prevented from browning for periods of about 2.5 to 3.5 months, which periods are required for distribution, and the tuna meat after thawing exhibits not excessively bright pink but as in the tuna treated with 100% CO gas. The smoked tuna meat after thawing exhibits metmyoglobin-formation to a similar extent and shows a change in color in a similar manner to those of untreated tuna, and the consumers therefore do not misread the freshness of the resulting tuna meat. The above-specified residual CO concentration ranging from 1100 to 2400 $\mu g/kg$ is set with respect to ordinary tuna and must be adjusted in consideration of individual differences (e.g., freshness and quality of flesh) of tuna.

SUMMARY OF THE INVENTION

The present invention has been accomplished based on these findings, and a technical object of the present invention is to provide a method for preserving tuna. The method can sufficiently prevent deterioration and denaturation of tuna meat even at a freezing temperature of about $-18°$ C., at which temperature less cost of equipment and less energy are required, and therefore can keep the quality of the tuna meat during transportation in frozen storage at that temperature for a required time period. The method can also prevent metmyoglobin-formation of the tuna meat during freezing. The treated tuna meat after thawing changes in color with time to a similar extent to that of untreated tuna meat. Consequently, the consumers do not misread the freshness and other conditions of the tuna meat. Such misreading occurs in excessively preserved or cured tuna meat.

To achieve the above objects, the present invention provides a method for preserving tuna by bringing smoke into contact with a fresh tuna meat to be preserved, the smoke being generated by burning a smoking material and containing carbon monoxide gas. This method includes the steps of inserting a plurality of smoke-injection needles disposed in parallel into the tuna meat, ejecting bubbles of the smoke in small portions, inserting or removing the smoke-injection needles into or from the tuna meat while repeating the inserting and ejecting operations at intervals, thereby dispersively injecting the bubbles of the smoke into the tuna meat, thereby allowing a residual carbon monoxide concentration in the tuna meat to range from 1100 to 2400 $\mu g/kg$ (as measured according to Kumazawa's method mentioned below), and preserving the resulting tuna meat in frozen storage at about $-18°$ C. By this configuration, the resulting tuna meat can be preserved in frozen storage in a domestic refrigerator over a long time.

In the method for preserving tuna, injection of the smoke through the smoke injection needles into the tuna meat is very effective to smoke the tuna meat in a short time before its freshness is deteriorated.

The residual carbon monoxide concentration in the tuna meat is determined in such a manner that the tuna meat is heated in a predetermined amount of boiling water while blowing a pickup gas into the boiling water to thereby remove carbon monoxide being coordinated with myoglobin in the tuna meat from the myoglobin, and the resulting carbon monoxide gas is diffused into the pickup gas, the resulting gaseous mixture is placed into a Tedler sampling bag, and a gas concentration in the bag is determined by using a detector tube or by gas chromatography.

The method for preserving tuna meat can easily preserve tuna so that the smoked tuna meat is prevented from browning for periods of 2.5 to 3.5 months and the smoked tuna meat after thawing exhibits metmyoglobin-formation to a similar extent to that of an untreated tuna meat. The consumers do not misread the freshness of the resulting tuna meat. The aforementioned periods of 2.5 to 3.5 months are periods required for distribution.

It should be understood that cost of equipment and energy that are required for freezing and preserving and other distribution operations at $-18°$ C. are much less than those at $-60°$ C. Accordingly, the aforementioned method can significantly reduce distribution costs.

In addition, as the smoking procedure allows the cut tuna meat to be preserved in frozen storage at $-18°$ C., only edible portions of the tuna meat require freezing, storing and transporting. The edible portions occupy, on average, about 35% of the tuna meat. Accordingly, the method can save freezing, storage and transportation of scrap (to be incinerated) which occupies about 65% of the tuna meat, as compared with the case where the tuna meat is frozen at an extra-low temperature of $-60°$ C. or fresh tuna is transported by air. The method is very advantageous also in these cost efficiency and global environmental protection (control of the discharge of chlorofluorocarbons and $CO_2$).

As is described above, the method for preserving tuna of the present invention can impart preservative and sterilizing effects to the tuna meat by the use of smoke and can sufficiently prevent deterioration and denaturation of components in the tuna meat even at the freezing temperature, while maintaining the tuna meat substantially raw. Accordingly, the method can keep the quality of the tuna meat during transportation in frozen storage for distribution.

In addition, according to the method of the present invention, the residual CO concentration is set at 1100 to 2400 $\mu g/kg$ by injecting a required amount of the smoke containing CO into the tuna meat using injection needles. The residual CO concentration depends on the relationship among the amount of smoke and CO concentration in the bubbles and the residual CO concentration in untreated tuna meat (a background CO concentration). The smoking operation, in which the residual CO concentration is controlled by the use of the smoke injection needles, is very effective for smoking the tuna meat deep inside in a short time without deteriorating the freshness of the tuna meat.

Furthermore, the method can uniformize the residual CO concentration in a short time regardless of the thickness of the tuna meat (either fillet or loin) and can freely control the duration for which metmyoglobin-formation occurs, for example, to seven days or nine days by controlling the residual CO concentration. Therefore, the method can preserve the tuna meat of good quality with an uniformized residual CO concentration.

The relationship between time and depth of permeation and distribution of the smoke gas into the tuna meat is not given in a simple curve as described above. Almost no other techniques than needle puncher smoke-injection apparatus can significantly allow the CO gas in the smoke precisely and homogeneously coordinate with the tuna meat so that the concentration falls within the range of 1100 to 2400 µg/kg in the tuna meat.

As is described in detail above, the method of the present invention can impart preservative and sterilizing effects to the tuna meat while keeping the same as wholesome as fresh one, can sufficiently prevent deterioration and denaturation of components in the tuna meat even at a freezing temperature of −18° C. and can keep its quality during long transportation in frozen storage for distribution. In addition, the method for preserving tuna can prevent metmyoglobin-formation of the tuna meat for a specified period within which the tuna meat is prevented from browning during freezing, and the treated tuna meat after thawing changes in color with time as in that of untreated tuna meat.

DESCRIPTION OF THE EMBODIMENTS

Figure 1:
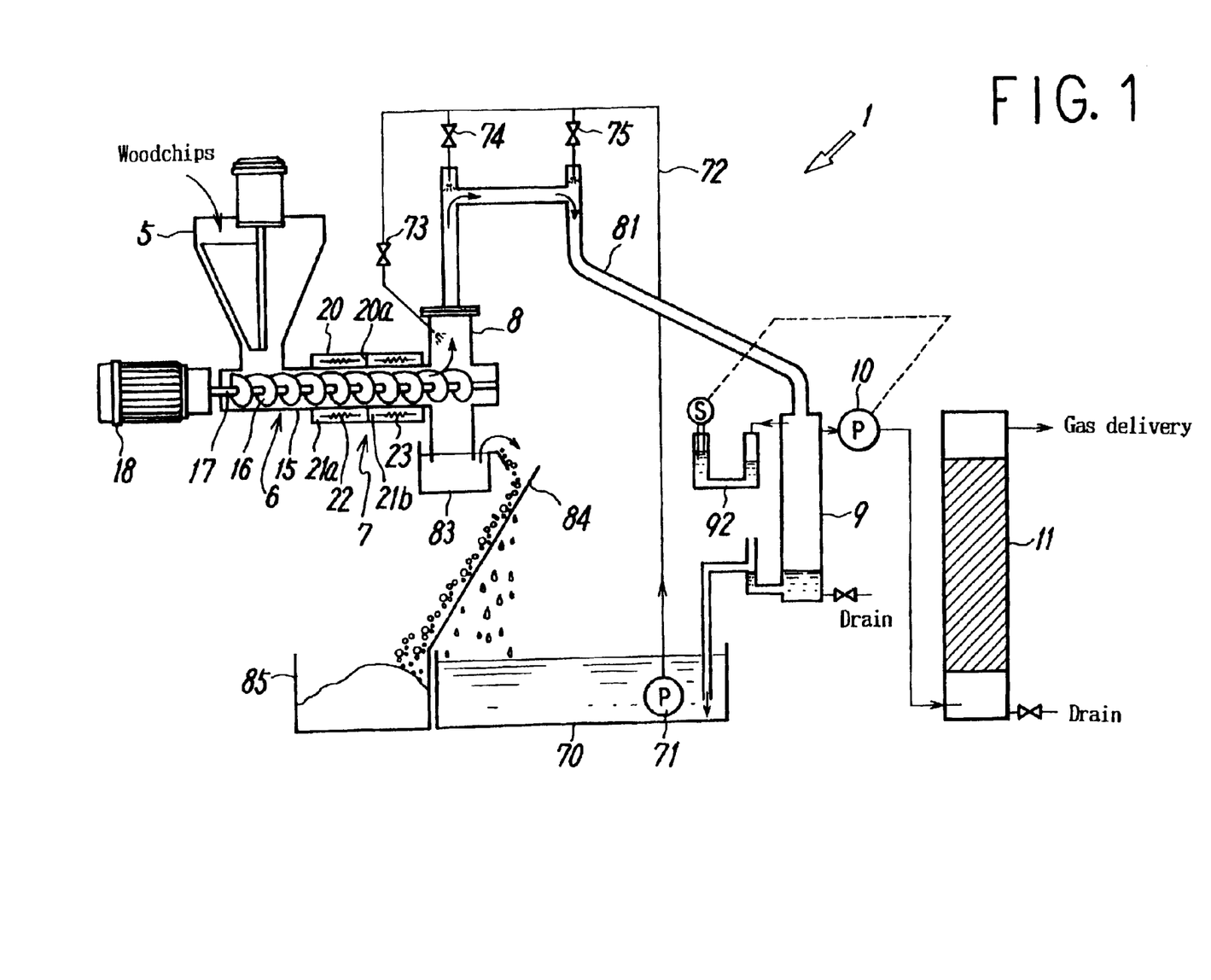
FIG. 1 is a diagram showing a smoke-generating system for use in the generation of smoke containing desired components in the method of the present invention.

In smoking of tuna meat according to the method of the present invention, smoke containing desired components must be generated first. A smoke-generating system as illustrated in FIG. 1 is used to generate the smoke.

The smoke-generating system 1 comprises a hopper 5, a screw transfer means 6, a gas discharge column 8, a gas-liquid separation column 9, a diaphragm pump 10, a smoke-filtering unit (a deodorizing column) 11, and a control means (not shown). Woodchips as a smoking material which have been adjusted, for example, in size, moisture content and type, are put into the hopper 5. The screw transfer means 6 transfers the woodchips supplied from the hopper 5 and has a heating means 7. The gas discharge column 8 is disposed downstream from the screw transfer means 6, and a high pressure wash water is supplied to the gas discharge column 8. A gas discharged from the gas discharge column 8 is conveyed into the gas-liquid separation column 9. The diaphragm pump 10 transfers the smoke separated in the gas-liquid separation column 9. The smoke-filtering unit 11 is connected to the diaphragm pump 10. The control means controls the operations of these units and can thereby control the transfer rate of the woodchips, the heating temperature of the heating means, the flow rate of produced smoke, and the CO concentration in the smoke.

The screw transfer means 6 comprises a round cylinder 15, spiral screw 16, and a screw motor 18. The cylinder 16 is connected to an outlet of the hopper 5. The screw 16 is mounted on a screw axis 17 that is disposed in the cylinder 15 and extends in an axial direction thereof. The screw motor 18 is disposed outside the cylinder 15, penetrated the cylinder 15, is connected to the screw axis 17 and drives the screw 16. The screw transfer means 6 transfers the woodchips in the cylinder 15 by rotating the screw 16.

The heating means 7 heats the woodchips transferring in the cylinder and thereby yields smoke in the following manner. Specifically, a major diameter cylinder 20 covers part of the cylinder constituting the cylinder 15, has closed both ends and has a radial diaphragm 20a at its center. By this configuration, two chambers 21a and 21b are formed between the part of the cylinder constituting the cylinder 15 and the major diameter cylinder 20 and are partitioned by the diaphragm 20a. A first heater 22 and a second heater 23 are disposed in the chambers 21a and 21b, respectively. The first heater 22 and the second heater 23 heat the part of the cylinder constituting the cylinder 15.

The heating means 7 includes two portions comprising the first heater 22 and the second heater 23. The upstream first heater 22 is used for heating at low temperatures (preheating) to thereby heat the woodchips to a temperature just below the thermal decomposition temperature of the woodchips.

The downstream second heater 23 is used for heating so that the woodchips are thermally decomposed in the presence of little amount of oxygen and thereby yields the smoke.

The heating means 7 heats in two portions (in two stages), and thereby the resulting smoke contains stabilized components even if raw materials have different moisture contents.

The gas discharge column 8 is disposed downstream the heating means 7 of the cylinder 15. The screw 16 extends to the inside of the gas discharge column 8. To the gas discharge column 8, a mixture of a gas, liquid and solid is transferred, which mixture is formed from the woodchips heated by the heating means 7. In addition, water is supplied from a reservoir 70 via a pump 71, pipe 72 and an on-off valve 73 and 74 to the gas discharge column 8 and is sprayed thereto as a high pressure wash water.

The gas transferred to the gas discharge column 8 contains a large amounts of carbon particles and gaseous tar. However, the high pressure wash water is sprayed to wash a surface of the gas discharge column 8 in contact with the gas, and thereby the adhesion of the carbon and tar to the contact surface is prevented.

The screw axis 17 is cooled by the wash water. However, when the screw axis 17 is continuously and adequately cooled, the gas may escape from a packing disposed at the tip of the screw axis.

The mixture of a gas, liquid and solid transferred to the gas discharge column 8 is separated into the gas, liquid and solid, respectively, in the gas discharge column 8. The gas is then supplied with the interposition of an on-off valve 75 via an exhaust pipe 81 to the gas-liquid separation column 9. To the exhaust pipe 81, the high-pressure wash water is sprayed. The solid and liquid continuously drip with the wash water to a charcoal exhaust tray 83, overflow the charcoal exhaust tray 83 into a wire mesh 84. The water is supplied to the reservoir 70, and the solid is supplied to a charcoal exhaust tank 85.

The water in the reservoir 70 is recycled and reused as the high pressure wash water, but a makeup water is replenished to the reservoir 70 according to necessity.

The condition of the smoke generating system 1 can indirectly be grasped by observing the condition of the exhausted charcoal. For example, when sintered exhausted charcoal includes grains having a large grain size, it means that the material wood is tar-rich and unstably yields the gas in many cases. In this case, chaff, active carbon and other ingredients may be added to the smoking material.

The diaphragm pump 10 is connected to a pressure retaining means 92 and transfers the smoke separated in the gas-liquid separation column 9 at a constant pressure. The pressure retaining means 92 is mounted on the gas-liquid separation column 9 and has a pressure detecting means.

The ratio of the air in the smoke can relatively precisely be set by adjusting the pressure in the pressure retaining means 92. When the pressure inside the exhaust pipe 81 is set at a negative pressure, the air is aspirated from the hopper 5 to thereby dilute the smoke.

When the pressure inside the exhaust pipe 81 is set at a positive pressure, the amount of the air from the hopper 5 to be mixed is decreased. However, if the pressure is set at an excessively high pressure, the produced smoke runs back to the hopper 5.

The smoke-generating system 1 is an external heating system and is fully electrically controlled. The amount of the produced smoke depends on the capacity of a heat source.

The smoke-generating system 1 has a flow rate of the produced smoke ranging from 4 to 6 L/min. and is difficult to produce a large amount of smoke at once. When a large amount of the smoke is required at once, the produced smoke is stored, for example, in a reservoir member such as a bag beforehand and is supplied to the smoking.

As mentioned above, the smoke-generating system 1 can control the flow rate of the produced smoke and can also control the CO concentration in the smoke.

Specifically, the CO concentration in the smoke can be controlled by controlling the heater temperature and the feed speed of the screw. Accordingly, the smoke having a desired CO concentration can be produced steadily, stably and reliably.

Smoking materials for use in the smoke-generating system 1 include smoking materials of various types of trees generally used in smoking, such as oak, Japanese oak, cherry tree, alder, chinquapin, oak (*Quercus dentata*), walnut tree, Japanese common chestnut, white birch, hickory, poplar, plane tree and other trees.

The smoke containing appropriately controlled amounts of components and having an appropriate CO concentration is supplied to the smoke filtering unit (deodorizing column) 11 to allow the produced smoke to pass through a filter. By this configuration, tar and smells in the smoke are removed, and the resulting filtered smoke contains components having high preservative, sterilizing, and discoloring-inhibitory effects. Active carbon, for example, is suitable as the filter to remove the smells.

The tuna meat to be treated is then smoked by bringing the produced smoke into contact with the tuna meat. In this procedure, the bubbles of the smoke are homogeneously and three-dimensionally dispersed into the tuna meat using smoke injection needles in the following manner.

Initially, an aspirator such as a vacuum pump is connected via a pipe to the outlet of the smoke-filtering apparatus 11 and brings the smoke out. The resulting smoke is supplied to be brought into contact with the tuna meat to be eaten raw in a subsequent smoking step.

In the smoking step, the smoking is completed in a very short time, and the use of cooled smoke is not specifically required.

Alternatively, the smoke brought out by the aspirator is contained in a bag such as a plastic bag or an appropriate container, where necessary the bag or container containing the smoke is stored and cooled in a refrigerator and is then connected to a smoke supply port of the smoke injection apparatus in the smoking step, and thereby the cooled smoke contained therein is brought into contact with the tuna meat to be eaten raw.

Figure 2:
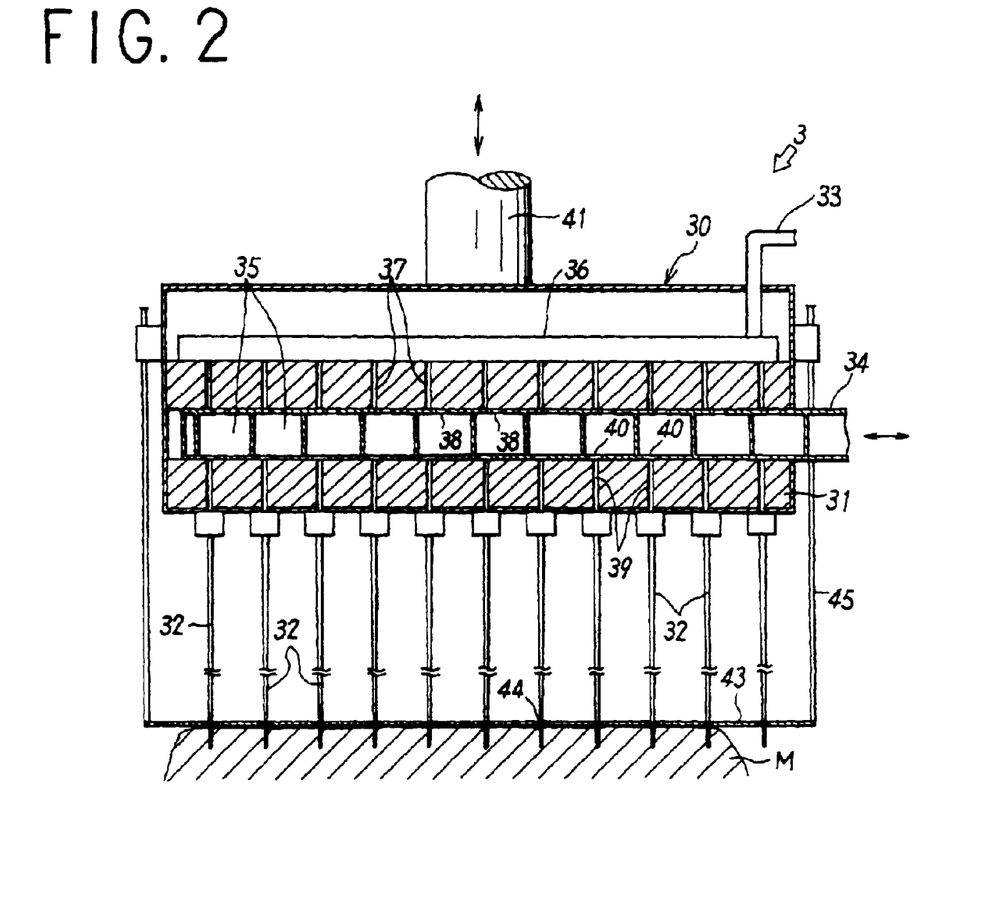
FIG. 2 is a sectional view showing the construction of a smoke injection apparatus for use in the present invention.
Figure 3:
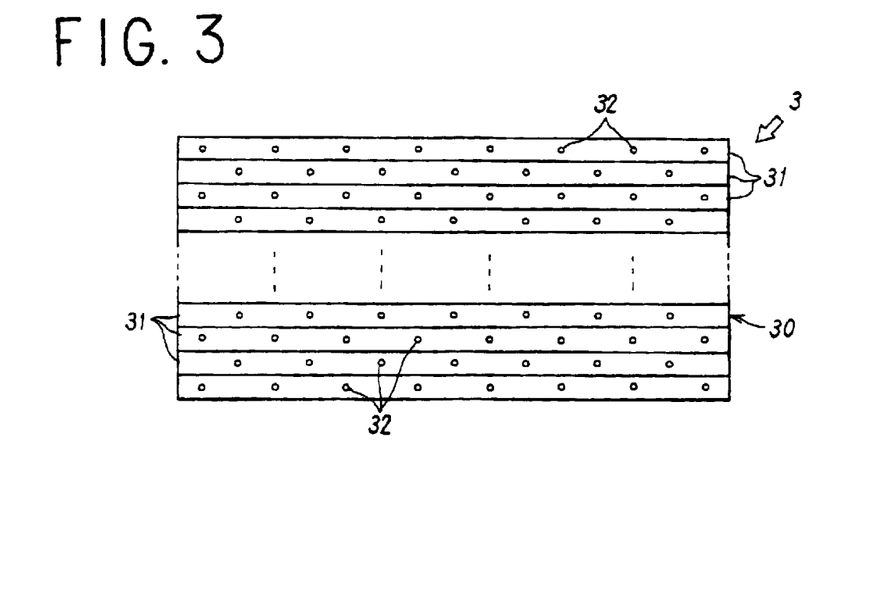
FIG. 3 is a bottom view showing the array of smoke injection needles in the smoke injection apparatus.

Previous experimental examples have revealed that the smoke permeates the tuna meat at a permeability of 4 mm or more per hour in early stages regardless of whether the smoking is performed at ambient pressure or under a pressure (under a load). Noting this fact, a smoke injection apparatus 3 as shown in FIGS. 2 and 3 comprises a number of smoke injection needles 32 disposed in parallel at almost constant intervals (e.g., intervals of several millimeters) set in consideration of the above permeability. In the smoking step, the smoke injection needles 32 are inserted into the tuna meat M, bubbles of the smoke are ejected at a constant pressure in a constant volume from the tips of the smoke injection needles 32, the ejection of the smoke is repeated at intervals of several millimeters while inserting or removing the smoke injection needles 32 into or from the tuna meat M. Thus, the smoke is injected at constant intervals in a constant amount, and thereby the bubbles of the smoke in a small amount are dispersively injected into the tuna meat and are allowed to uniformly permeate and diffuse inside the tuna meat M.

The amount of the smoke in the bubbles is set so that the ultimate residual CO concentration falls within a range from 1100 to 2400 $\mu$g/kg depending on the relationship between the CO concentration in the smoke and the background CO concentration of untreated tuna meat. The present inventor has experimentally and empirically verified that the above specified range is such a range that the smoked tuna meat derived from a fresh tuna meat is prevented from browning for 2.5 to 3.5 months during freezing at about −18° C., and the smoked tuna meat after thawing exhibits metmyoglobin-formation to a similar extent to that of an untreated tuna meat. The amount of CO injected as the smoke can optionally be set by controlling, for example, the CO concentration in the smoke, the pressure, injected amount and injection intervals of the smoke.

The browning of the tuna meat frozen and stored at −18° C. is prevented mainly by action of carbon monoxide (CO) in the smoke. Specifically, CO is bonded (coordinated) with reduced Mb containing a divalent iron ion and thereby significantly prevents the coordination of $O_2$ (as CO has an affinity to the reduced Mb at least 100 times higher than that of $O_2$), and thereby oxidation of iron from divalent iron to trivalent iron (browning) is prevented. The browning is more highly prevented with an increasing carbon monoxide concentration in the smoke and with an increasing residual CO concentration in the tuna. Accordingly, the tuna meat kept at —18° C. is prevented from browning for an increasing period of time with an increasing CO concentration in the smoke gas and with an increasing time for smoking. However, if the residual CO concentration is excessively high, the resulting tuna meat exhibits an unnatural bright red color, and the tuna meat after thawing keeps bright red for a long time (browning does not occur). To avoid this problem, the residual CO concentration must be set so that the tuna meat frozen and stored at −18° C. is prevented from browning for 2.5 to 3.5 months in view of distribution of frozen tuna.

Only minor components in the smoke other than CO can have effects such as preservative, sterilizing and improvement of flavor effects on the tuna meat.

The smoke contains about 200 types of organic compounds. Typical examples of such organic compounds are shown in Table 1.

TABLE 1

| Acids: | |
| --- | --- |
| Formic acid | HCOOH |
| Acetic acid | $CH_3COOH$ |
| Aliphatic aldehydes: | |
| Formaldehyde | HCHO |
| Acetaldehyde | $CH_3CHO$ |
| Cyclic aldehydes: | |
| Furfural | $C_4H_8OCHO$ |
| Methylfurfural | $CH_3C_4H_2OCHO$ |
| Aromatic aldehydes: | |
| Vanillin | $CH_3COC_6H_3(OH)CHO$ |
| Syringic aldehyde | $(CH_3O)_2C_6H_2(OH)CHO$ |
| Aliphatic ketones: | |
| Acetone | $CH_3COCH_3$ |
| Methyl ethyl ketone | $CH_3COCH_2CH_3$ |
| Monohydric alcohol: | |
| Methyl alcohol | $CH_3OH$ |
| Ethyl alcohol | $CH_3CH_2OH$ |
| Monohydric phenols: | |
| Phenol | $C_6H_6O$ |
| Cresol | $C_7H_8O$ |
| Xylenol | $C_8H_{10}O$ |
| Anisole | $C_7H_8O$ |
| Thymol | $C_{10}H_{14}O$ |
| Dihydric phenols: | |
| Pyrocatechine | $C_6H_8O_2$ |
| Guaiacol | $C_7H_6O2$ |
| Ethylguaiacol | $C_9H_{12}O_2$ |
| Propylguaiacol | $C_{10}H_{14}O_2$ |
| Eugenol | $C_{10}H_{12}O_2$ |
| Trihydric phenols: | |
| Pyrogallol | $C_6H_6O_3$ |
| Pyrogallol monomethylether | $C_7H_8O_3$ |
| Pyrogallol dimethyl ether | $C_{11}H_{16}O_3$ |
| Veratrole | $C_2H_{10}O_3$ |
| Bases: | |
| Methylamine | $CH_3NH_2$ |
| Ethylamine | $C_2H_8NH_2$ |
| Hydrocarbons: | |
| 3,4-Benzpyrene | $C_{20}H_{12}$ |

With reference to FIG. 3, the smoke injection apparatus 3 comprises a multitude of injection needle supports 31 carrying a multitude of smoke injection needles 32 disposed in parallel at constant intervals. The injection needle supports 31 are arrayed in rows so that each of the injection needles 32 is disposed between adjacent injection needles 32 on an adjacent injection needle support 31, that is, the injection needles 32 are arrayed in rows in a staggered configuration. By this construction, an injection apparatus body 30 comprises the multitude of injection needle supports 31 and carries several tens or several hundreds of the smoke injection needles 32 regularly arrayed in a multitude of rows and a multitude of columns. Thus, the smoke injection apparatus 3 injects the smoke at constant intervals into the tuna meat M through holes inside the inserted smoke injection needles 32. Each of the injection needle supports 31 has a smoke supply pipe 33 to supply the smoke. The smoke is supplied from the smoke filtering apparatus 11 or the refrigerator for the smoke, or is contained and stored in the bag such as a plastic bag.

To supply the smoke from the smoke filtering apparatus 11 or the smoke refrigerator, the piping of the smoke may be connected to the smoke supply pipe 33. To supply the smoke contained and stored in the bag such as a plastic bag, the bag is detachably mounted to the smoke supply tube 33. By this configuration, the bag can be replaced with another one at the time when the bag becomes empty of the smoke, and the smoke from a new bag can be supplied to the smoke injection needles 32.

Before supplying, the smoke can be pressurized to 2 to 10 $kg/cm^2$ using a pressure device disposed in the smoke supply tube 33 according to necessity.

With reference to FIG. 2, each of the injection needle supports 31 includes a movable valve 34 that can reciprocate in a direction of the arrow by action of a drive not shown in the figure. The movable valve 34 includes a multitude of air chambers 35 each having a capacity that is necessary to deliver one bubble of the smoke and being arrayed in rows corresponding to individual smoke injection needles 32. Each of the air chambers 35 in the movable valve 34 includes a supply through-hole 38 and an injection through-hole 40. The supply through-hole 38 is connected to or disconnected from an individual channel 37 depending on the movement of the movable valve 34. The individual channel 37 is from a distributor 36 communicating with the smoke supply tube 33. The injection through-hole 40 is connected to and disconnected from an injection channel 39 depending on the movement of the movable valve 34. The injection channel 39 communicates with the smoke injection needle 32. The individual channel 37 is connected to the supply through-hole 38 when the movable valve 34 is at one end of movement (left end) and is disconnected therefrom when the movable valve 34 is at the other end as shown in FIG. 2. The injection channel 39 communicating with the smoke injection needle 32 is disconnected from the injection through-hole 40 when the movable valve 34 is disposed at one end of movement, and the individual channel 37 is connected to the supply through-hole 38. In contrast, the injection channel 39 is connected to the injection through-hole 40 when the individual channel 37 and the supply through-hole 38 are disconnected from each other, as shown in FIG. 2.

Figure 4:
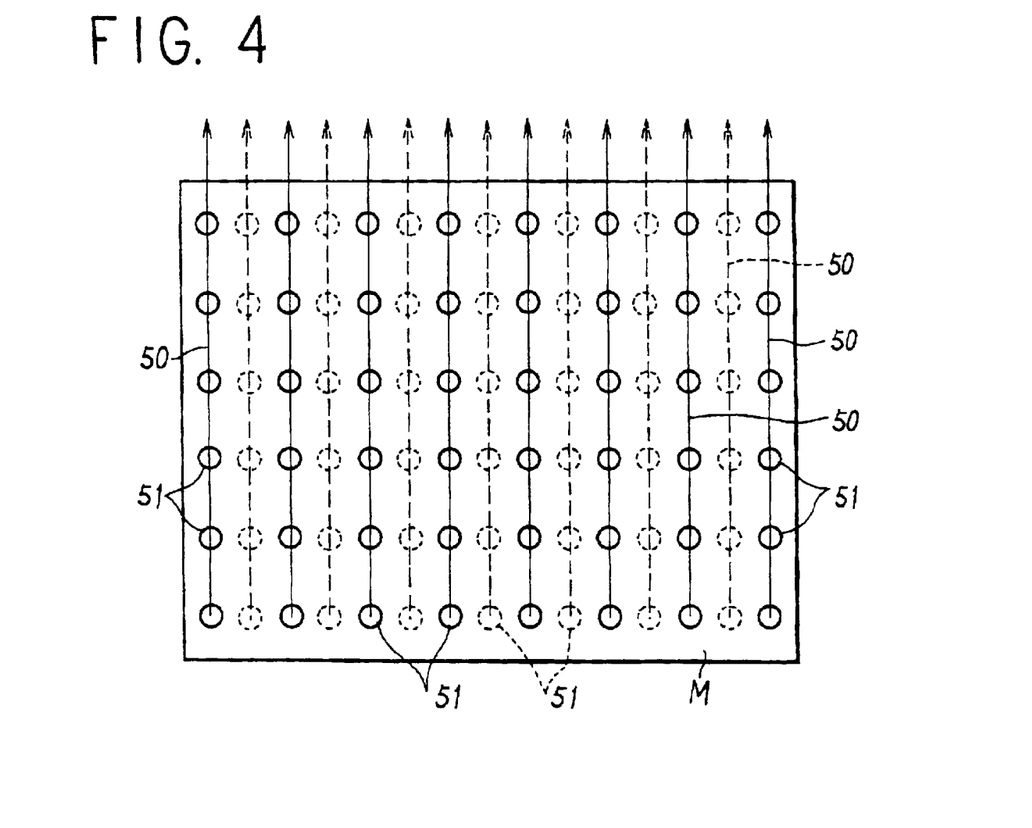
FIG. 4 is an explanatory drawing showing an embodiment where bubbles of the smoke are injected into tuna meat using the smoke injection needles.

In addition, a driving member 41 is connected to the smoke injection apparatus 3 and moves an injection apparatus body 30 up and down by action of a drive not shown. The driving member 41 moves downward and thereby serves to insert the smoke injection needles 32 deep into the tuna meat M and is then intermittently driven by a constant distance (e.g., 5 mm) in a direction toward which the smoke injection needles 32 are withdrawn from the tuna meat M every time when bubbles of the smoke in a small amount are ejected from the tips of the smoke injection needles 32 inserted into the tuna meat. As a result, the bubbles 51 of the smoke are injected into traces 50 of the smoke injection needles 32 in the tuna meat M and are distributed almost uniformly on a plane (horizontal plane) of the arrayed injection needles 32 and in a thickness direction of the tuna meat, as shown in FIG. 4. The smoke can be injected when the smoke injection needles 32 are inserted into the tuna meat.

The smoke bubbles 51 can be injected by driving the movable valve 34 reciprocating in a direction of the arrow. Specifically, with reference to FIG. 2, the movable valve 34 is at first at the left end, the individual channels 37 are connected to the supply through-holes 38, and thereby the pressurized smoke is charged into each of the air chambers 35. From this position, the movable valve 34 is moved to the position shown in the figure, the injection channels 39 are connected to the injection through-holes 40, and thereby the smoke charged in the air chambers 35 is delivered through the smoke injection needles 32 by action of its pressure. After the delivery of the smoke, the movable valve 34 is returned to the left end, the individual channels 37 are connected to the supply through-holes 38 again, and thereby the pressurized smoke is charged into each of the air chambers 35.

To prevent the smoke injection needles 32 from curving or bending when they are inserted into the tuna meat, the injection apparatus body 30 includes a needle guide 43 having guide holes 44. Each of the smoke injection needles 32 are inserted into each of the guide holes 44. The needle guide 43 is held on the injection apparatus body 30 by means of an elevating arm 45 and is controlled to be driven and to be moved up and down. The needle guide 43 is disposed close to the tips of the smoke injection needles 32 as shown in FIG. 2 when the smoke injection needles 32 start moving down by action of the driving member 41. The needle guide 43 moves down with the driving member 41 and then comes into contact with the tuna meat M, and from this point of time, the needle guide 43 is held stand at the position. When the smoke injection needles 32 are withdrawn from the tuna meat M, the needle guide 34 presses down the tuna meat M and thereby prevents the tuna meat from lifting, and when the portions of the smoke injection needles 32 close to their tips reach the guide holes 44 of the needle guide 43, the needle guide 43 is moved upward together with the smoke injection needles 32.

To automate the injection of the smoke into the tuna meat, the smoke is injected into the tuna meat M while the tuna meat M is conveyed by a conveyer in synchronism with up-and-down movement of the driving member 41 at intervals. In this procedure, the following operations are also acceptable. Specifically, the injection apparatus body 30 is fixed, a stage of the tuna meat is moved up and down, and thereby relatively similar operations to those of the insertion of the smoke injection needles 32 into the tuna meat M by action of the driving member 41 are performed.

The smoke bubbles injected into the tuna meat with a constant spacing diffuse toward surroundings. Accordingly, the smoke bubbles can permeate into the whole tuna meat within a time period from 20 minutes to 2 hours, and preferably from 30 minutes to 1 hour, by appropriately setting the lengthwise and widthwise spacings of the smoke injection needles 32 and the injection intervals of the bubbles by action of the driving member 41.

The spacing between the bubbles depends on the spacing of the smoke injection needles 32 and the injection intervals of the bubbles during the movement of the driving member 41 and must be set so that the injected and dispersed smoke bubbles penetrate the whole tuna meat within a time period from 20 minutes to 2 hours and preferably from 30 minutes to 1 hour.

The smoke injection needles used in the smoke injection apparatus each have a diameter of less than or equal to about 1 mm, and thereby the smoke injection needles do not leave marks in the tuna meat behind.

In consideration of distribution of the tuna meat, the tuna meat must be prevented from browning during freezing at −18° C. for at least 2.5 months. To satisfy this requirement, the residual CO concentration in the tuna meat should preferably be equal to or more than 1100 $\mu$g/kg as mentioned above, and should more preferably be equal to or more than 1500 $\mu$g/kg. The tuna meat after thawing preferably exhibits a change in color with time to a similar extent to that of untreated tuna meat. To satisfy this requirement, the residual CO concentration in the tuna meat should preferably be less than or equal to 2400 $\mu$g/kg It is also known that untreated tuna meat that has been in frozen storage at −60° C. and has then been thawed exhibits browning within about 12 days. The above specified residual CO concentration of less than or equal to 2400 $\mu$g/kg is an upper limit such that the smoked tuna meat exhibits browning within about 12 days as in the untreated tuna meat. The present inventor has also verified this fact practically.

A summary of the above description is as follows.

(1) The tuna meat during freezing at −18° C. must be prevented from browning for at least 2.5 months. To satisfy this requirement, the residual CO concentration has a lower limit of 1100 $\mu$g/kg.

(2) The smoked tuna meat must not exhibit excessively bright color and must exhibit natural color similar to that of untreated raw tuna meat. To satisfy this requirement, the residual CO concentration has an upper limit of 2400 $\mu$g/kg.

(3) The color of the smoked tuna meat after thawing must change with time in a similar manner to that of untreated tuna meat, and thereby the tuna meat must exhibit metmyoglobin-formation and browning within about 12 days. The upper limit of 2400 $\mu$g/kg in the residual CO concentration in (2) is also required for satisfying this requirement.

The tuna meat after the completion of the smoking is transported to a consumption area in conventional frozen storage at about −18° C. The resulting tuna meat can keep its quality during transportation in frozen storage for long-term distribution and can be prevented from metmyoglobin-formation, i.e., from browning, during freezing within the specified time period by using low-cost refrigeration facilities at about −18° C. In other words, the resulting tuna meat does not require expensive extra-low temperature refrigeration facilities at −60° C., can therefore save energy and has cost efficiency.

In this connection, almost no extra-low temperature refrigeration facilities at −60° C. are provided at present in other countries such as U.S.A. and European countries than Japan.

The transportation in ultra-deep frozen storage at −60° C. is a unique system in Japan and is not generally used in the other countries such as U.S.A. and European countries. The transportation of the tuna meat in frozen storage at −18° C. can be realized by the present invention and can therefore be applied to all the countries in the world.

In the method for preserving tuna, the residual CO concentration in the tuna meat must be determined according to necessity. In Japan, a method for determining the residual CO concentration is limited to the method A as specified by the Ministry of Health and Welfare of Japan. However, the method A is not always an appropriate measuring method, and the residual CO concentration should be determined by Kumazawa's method shown in FIG. 5, as mentioned below. All the residual CO concentrations in the present specification are determined by Kumazawa's method.

According to the method A, 600 g of water is added to 300 g of a sample, the resulting mixture is cooled on ice and is homogenized for 1 minute using a homogenizer and thereby yields a sample mixture, 200 g of the sample mixture is placed in a centrifuge tube, is centrifuged at 10° C. and thereby yields a sample solution as a supernatant. Next, 50 ml of the sample solution is placed in a head base bottle, and five drops of octyl alcohol as a defoaming agent, 5 ml of water and 20 ml of a 20-% sulfuric acid are added to the sample solution, a cap with a silicone rubber septum is put on the bottle, and the bottle is then vigorously shaken for 2 minutes. After standing still for 10 minutes, the bottle is shaken again for 1 minute, a gas phase in the bottle is then immediately sampled in a gastight syringe and is injected into a gas chromatograph to thereby determine the CO concentration in the sample based on a calibration curve separately prepared.

In another measuring method known as a method B, 1.5 ml of clean air is placed in a gastight syringe, is injected into a vacuum package for fresh fish, 1.0 ml of the resulting gas is immediately sampled, and CO concentration is then determined using gas chromatography.

The disadvantages of the method A will be described with reference to the comparison in measurement principles between the method A and the method B.

Carbon monoxide (CO) has affinity to the reduced Mb in the tuna meat much higher than that of $O_2$ and significantly inhibits the coordination of $O_2$. Accordingly, CO reduces the amount of the oxymyoglobin ($O_2$Mb) coordinating with $O_2$ and thereby reduces the amount of the resulting brown metmyoglobin (MetMb). Specifically, apparent browning can be prevented by allowing CO to coordinate with Mb beforehand.

The coordination reaction of CO with Mb in the tuna meat is represented by the following formula:

$$CO+Mb=COMb \quad (a)$$

The equilibrium constant (stability constant) of the coordination reaction increases with an elevating temperature and is 100 times or more higher than that of a similar coordination reaction between $O_2$ and Mb:

$$O_2+Mb=O_2Mb \quad (b)$$

Accordingly, when the tuna meat comes into contact with the air containing almost no CO, the reaction (a) proceeds toward the left-hand side, and thereby COMb once formed in the tuna meat releases CO into the air. This fact is supposed to be a major cause to yield 14 times or more variation in the measurements of the residual CO concentration according to the method A.

In contrast, the measurement principle of the method B utilizes the fact that, when the tuna meat comes in contact with the air containing almost no CO, the reaction (a) proceeds toward the left-hand side, and thereby COMb once formed in the tuna meat releases CO into the air. Accordingly, it can be said that the method (B) utilizes the main cause of the critical measurement error of the residual CO concentration according to the method A. The method B implicitly admits the defect of the method A, and these two methods are contradictory to each other.

In addition, it has been pointed out that the measurements of the residual CO concentration according to the method A vary from one inspection agency designated by the Ministry of Health and Welfare of Japan to another and exhibit large errors, indicating that the reproducibility of results of measurements is insufficient.

To verify these, twelve uniform specimens were prepared from one sample (smoked bigeye tuna), of which three specimens (A, B and C) each were sent to three inspection agencies (X, Y and Z) designated by the Ministry of Health and Welfare of Japan, respectively, at different date to determine the residual CO concentration according to the method A. The residual CO concentrations of these nine specimens should be close to each other if the measuring method is proper. The remained three specimens were subjected to measurement of the residual CO concentration according to Kumazawa's method described below.

Kumazawa's method is a measuring method of the residual CO concentration developed by Mr. Hidehiro Kumazawa (a Toyama University Faculty of Engineering professor). In summary, the tuna meat is heated in a predetermined amount of boiling water, thereby CO coordinated with the tuna meat is released into a gas phase, a pickup gas is bubbled into the boiling water, the resulting gases are collected in a Tedler bag, and the CO concentration of the gas in the bag is determined by using a detector tube or by gas chromatography.

Figure 5:
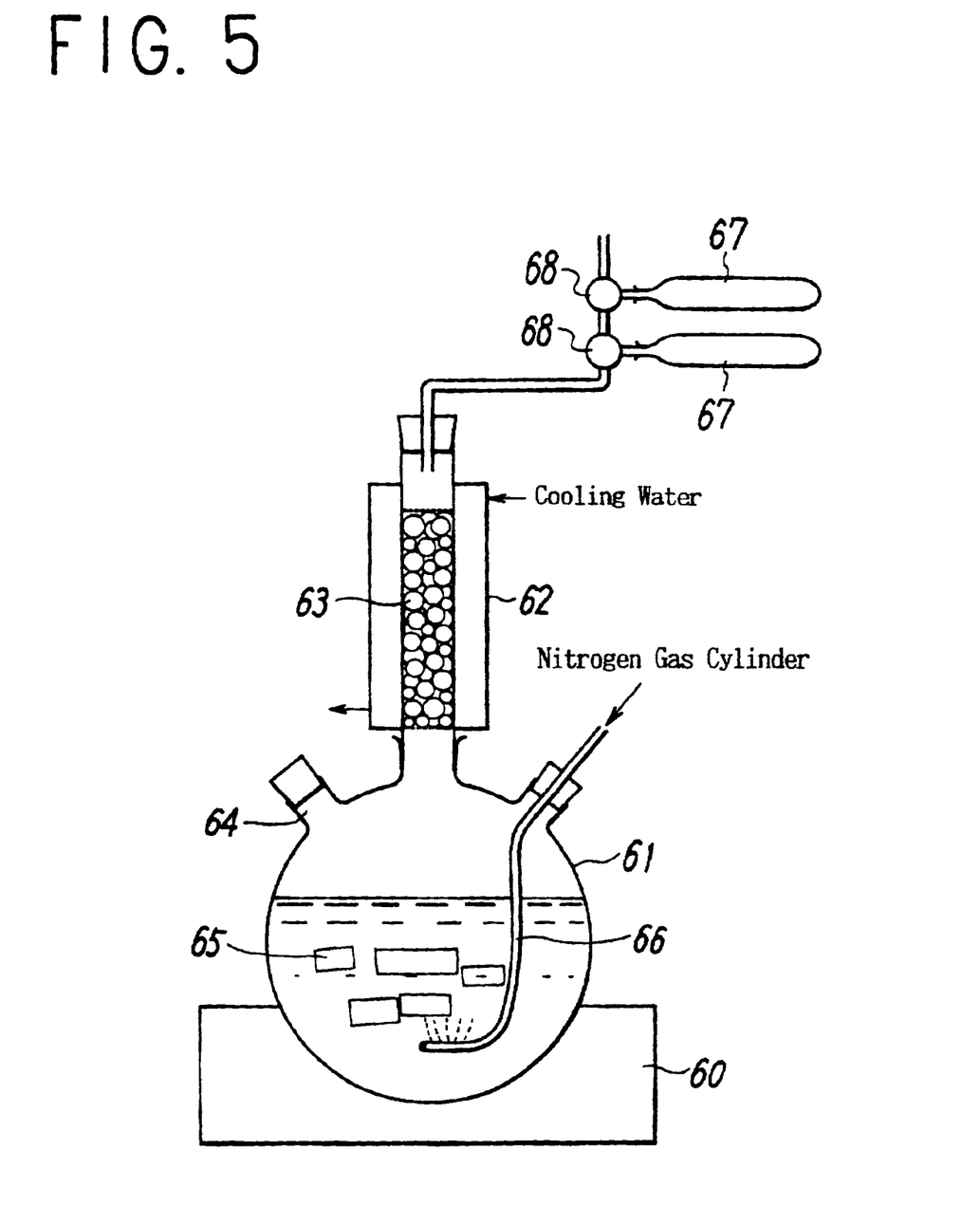
FIG. 5 is a schematic diagram showing an apparatus for use in measurement of the residual CO concentration in the tuna meat according to Kumazawa's method.

Kumazawa's method will be illustrated in further detail with reference to FIG. 5.

(1) Water in a 1-liter flask 61 is brought to the boil by a heater 60. Vaporized water vapor is condensed in a condenser 62 connected to the flask, and the resulting condensed water is returned to the flask 61. The inside of the condenser 62 is filled with glass beads 63 to broaden a heat transfer area, according to necessity.

(2) A predetermined amount (e.g., 100 g) of tuna meat 65 is quickly put into the boiling water in the flask 61 from a sample inlet 64. In this procedure, the tuna meat is cut into small pieces in order to facilitate the tuna meat to release the coordinated CO.

(3) Nitrogen gas as a pickup gas is blown from a nitrogen gas cylinder via a stainless steel small tube 66 into the boiling water at a predetermined flow rate (e.g., 1 cm³/s). This procedure facilitates the release of CO from the tuna meat 65 into the gas phase and the movement of CO to a Tedler bag 67 for gas recovery.

(4) To collect the whole quantity of the released CO diluted with nitrogen gas as the pickup gas, the space between the flask 61 and the Tedler bag 67 for gas recovery is held as a closed system from the point of time when the tuna meat is put into the boiling water. When 100 g of the tuna meat is put into the boiling water and the flow rate of the pickup gas is held at 1 cm³/s, the Tedler bag has only to have a capacity of 2 liters.

The following procedure as shown in the figure is preferred. A plurality of Tedler bags 67 are connected with each other via three-way stopcocks 68, and the flask 61 is always connected to one Tedler bag 67 via the three-way stopcock 68. When the one bag is filled with the pickup gas, the flask 61 is connected to another Tedler bag 67 by action of the stopcock 68, and this procedure is repeated until CO is not detected.

(5) The CO concentration in the Tedler bag 67 is determined by using a detector tube or by gas chromatography.

The results of measurements in the three inspection agencies and by Kumazawa's method are shown in Table 2 as CO weight per 1 kg of the tuna. In the table, the term "/" means "(the initial concentration)/(the concentration on second day)".

TABLE 2

| Inspection agency | Specimen A | Specimen B | Specimen C |
|---|---|---|---|
| X | 75/120 | 1100/980 | 1000/940 |
| Y | 270/280 | 350/420 | 600/540 |
| Z | 640/470 | 571/607 | 352/364 |
| Toyama University | D:1490/1310 | D:1480/1240 | D:1220/1040 |
| (Kumazawa method) | G:1430/1180 | G:1470/1220 | G:1200/1050 |

Unit of figure: [μg/kg]
D: CO concentration measured by using a detector tube
G: CO concentration measured by gas chromatography Table 2 shows that the measurements of the three inspection agencies according to the method A vary from the minimum 75 μg/kg to the maximum 1100 μg/kg and show a large dispersion 14 times or more. The dispersion in the measurements markedly exceeds a range accepted as an analysis method, indicating that the measurement according to the method A clearly has a problematic reproducibility. In contrast, the measurements according to Kumazawa's method vary to a less extent, showing that this method has high reliability.

The measurements according to the method A range one sixth to one fourth those according to Kumazawa's method and exhibit a significantly large variation. This is probably because the procedure of the method A includes a number of steps with problems. Specifically, the above fact meets with the estimation that the method A does not reliably sample CO in the steps up to the preparation of a sample for injection to gas chromatography (CO is not prevented from dissipating).

In addition, it is pointed out that the method A has the following causes of error. Initially, the method A is on the precondition that all of CO is enclosed in the sample mixture in a step in which the sample mixture is prepared using a homogenizer. In this procedure, CO coordinated with the tuna meat inevitably escapes and is lost into the gas phase. When the tuna meat carrying CO coordinated therewith is brought into contact with the air, CO is dissipated into the air. This also constitutes the measurement principle of the method B.

A supernatant is sampled as a sample solution in the step of centrifuging according to the method A. In this procedure, all of CO must be transferred into the supernatant. However, as CO has very low solubility in an aqueous solution, it is doubtful that all of CO is dissolved in the supernatant. CO that is not fully dissolved escapes into the gas phase.

The method A is also on the precondition that the whole of CO is transferred into the gas phase in the step of preparation of the sample injected into a gas chromatograph. However, at least CO in a concentration in equilibrium with CO in the gas phase remains in a solution phase (liquid phase).

The present invention specifies the CO concentration, and it is not suitable for the present invention to determine the residual CO concentration in the tuna meat according to the method A that exhibits a large variation in the measurements induced by the aforementioned causes and shows poor reproducibility. Accordingly, the CO concentrations in the present invention are determined by Kumazawa's method.

What is claimed is:

1. A method for preserving tuna by bringing smoke into contact with a fresh tuna meat to be preserved, the smoke being generated by burning a smoking material and containing carbon monoxide gas, the method comprising the steps of: inserting a plurality of smoke-injection needles disposed in parallel into the tuna meat, ejecting bubbles of the smoke in small portions, inserting or removing the smoke-injection needles into or from the tuna meat while repeating the inserting and ejecting operations at intervals, thereby dispersively injecting the bubbles of the smoke into the tuna meat; thereby allowing a residual carbon monoxide concentration in the tuna meat to fall within a range from 1100 to 2400 μg/kg; and preserving the resulting tuna meat in frozen storage at about −18° C.

2. The method for preserving tuna according to claim 1, wherein the smoked tuna meat is prevented from browning during freezing at about −18° C. for 2.5 to 3.5 months and the smoked tuna meat after thawing exhibits metmyoglobin-formation to an extent near to that of an untreated tuna meat such that the thawed tuna meat exhibits browning within about 12 days.

3. The method for preserving tuna according to claim 1, wherein the residual carbon monoxide concentration in the tuna meat is determined in such a manner that the tuna meat is heated in a predetermined amount of boiling water while blowing a pickup gas into the boiling water, carbon monoxide coordinated with myoglobin in the tuna meat is thereby removed from the myoglobin and is diffused into the pickup gas, the resulting gaseous mixture is contained in a Tedler sampling bag, and a gas concentration in the bag is measured by using a detector tube or by gas chromatography to thereby determine the residual CO concentration.

4. The method for preserving tuna according to claim 2, wherein the residual carbon monoxide concentration in the tuna meat is determined in such a manner that the tuna meat is heated in a predetermined amount of boiling water while blowing a pickup gas into the boiling water, carbon monoxide coordinated with myoglobin in the tuna meat is thereby removed from the myoglobin and is diffused into the pickup gas, the resulting gaseous mixture is contained in a Tedler sampling bag, and a gas concentration in the bag is measured by using a detector tube or by gas chromatography to thereby determine the residual CO concentration.

5. The method for preserving tuna according to claim 1, wherein said ejecting is at constant intervals.

6. The method for preserving tuna according to claim 1, wherein said ejecting is at a constant pressure and a constant volume.

7. The method for preserving tuna according to claim 1, wherein said smoke further contains one or more organic compounds.

8. The method for preserving tuna according to claim 7, wherein said one or more organic compounds are selected from the group consisting of an organic acid, an aliphatic aldehyde, a cyclic aldehyde, an aromatic aldehyde, an aliphatic ketone, a monohydric alcohol, a monohydric phenol, a dihydric phenol, a trihydric phenol, an organic base, a hydrocarbon, and mixtures thereof.

9. The method for preserving tuna according to claim 7, wherein said one or more organic compounds are selected from the group consisting of formic acid, acetic acid, formaldehyde, acetaldehyde, furfural, methylfurfural, vanillin, syrinigic aldehyde, acetone, methyl ethyl ketone, methyl alcohol, ethyl alcohol, phenol, cresol, xylenol, anisole, thymol, pyrocatechine, guaiacol, ethylguaiacol, propylguaiacol, eugenol, pyrogallol, pyrogallol monomethylether, pyrogallol dimethyl ether, veratrole, methylamine, ethylamine, 3,4-benzpyrene, and mixtures thereof.

10. The method for preserving tuna according to claim 1, wherein said smoke is pressurized to 2 to 10 kg/cm$^2$ prior to said ejecting.

11. The method for preserving tuna according to claim 1, wherein said residual carbon monoxide concentration in the tuna meat is within a range from 1500 to 2400 μg/kg.

12. The method for preserving tuna according to claim 11, wherein the smoked tuna meat is prevented from browning during freezing at about −18° C. for 2.5 to 3.5 months and the smoked tuna meat after thawing exhibits metmyoglobin-formation to an extent near to that of an untreated tuna meat such that the thawed tuna meat exhibits browning within about 12 days.

13. The method for preserving tuna according to claim 11, wherein the residual carbon monoxide concentration in the tuna meat is determined in such a manner that the tuna meat is heated in a predetermined amount of boiling water while blowing a pickup gas into the boiling water, carbon monoxide coordinated with myoglobin in the tuna meat is thereby removed from the myoglobin and is diffused into the pickup gas, the resulting gaseous mixture is contained in a Tedler sampling bag, and a gas concentration in the bag is measured by using a detector tube or by gas chromatography to thereby determine the residual CO concentration.

14. The method for preserving tuna according to claim 12, wherein the residual carbon monoxide concentration in the tuna meat is determined in such a manner that the tuna meat is heated in a predetermined amount of boiling water while blowing a pickup gas into the boiling water, carbon monoxide coordinated with myoglobin in the tuna meat is thereby removed from the myoglobin and is diffused into the pickup gas, the resulting gaseous mixture is contained in a Tedler sampling bag, and a gas concentration in the bag is measured by using a detector tube or by gas chromatography to thereby determine the residual CO concentration.

15. The method for preserving tuna according to claim 11, wherein said ejecting is at constant intervals.

16. The method for preserving tuna according to claim 11, wherein said ejecting is at a constant pressure and a constant volume.

17. The method for preserving tuna according to claim 11, wherein said smoke further contains one or more organic compounds.

18. The method for preserving tuna according to claim 17, wherein said one or more organic compounds are selected from the group consisting of an organic acid, an aliphatic aldehyde, a cyclic aldehyde, an aromatic aldehyde, an aliphatic ketone, a monohydric alcohol, a monohydric phenol, a dihydric phenol, a trihydric phenol, an organic base, a hydrocarbon, and mixtures thereof.

19. The method for preserving tuna according to claim 17, wherein said one or more organic compounds are selected from the group consisting of formic acid, acetic acid, formaldehyde, acetaldehyde, furfural, methylfurfural, vanillin, syrinigic aldehyde, acetone, methyl ethyl ketone, methyl alcohol, ethyl alcohol, phenol, cresol, xylenol, anisole, thymol, pyrocatechine, guaiacol, ethylguaiacol, propylguaiacol, eugenol, pyrogallol, pyrogallol monomethylether, pyrogallol dimethyl ether, veratrole, methylamine, ethylamine, 3,4-benzpyrene, and mixtures thereof.

20. The method for preserving tuna according to claim 11, wherein said smoke is pressurized to 2 to 10 $kg/cm^2$ prior to said ejecting.

* * * * *